(12) United States Patent
Lai et al.

(10) Patent No.: US 9,088,221 B2
(45) Date of Patent: Jul. 21, 2015

(54) HIGH-VOLTAGE POWER SUPPLY MODULE AND POWER SUPPLY SYSTEM

(75) Inventors: Yuan-Fang Lai, Taoyuan Hsien (TW); Ying-Sung Chang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 947 days.

(21) Appl. No.: 13/274,532

(22) Filed: Oct. 17, 2011

(65) Prior Publication Data
US 2012/0104857 A1    May 3, 2012

(30) Foreign Application Priority Data

Nov. 3, 2010   (TW) ................................ 99137880 A

(51) Int. Cl.
| | | |
|---|---|---|
| *H02J 1/00* | (2006.01) | |
| *H02M 3/335* | (2006.01) | |
| *H02J 1/10* | (2006.01) | |
| *H02J 7/34* | (2006.01) | |
| *H02M 1/00* | (2007.01) | |

(52) U.S. Cl.
CPC ............ *H02M 3/33523* (2013.01); *H02J 1/108* (2013.01); *H02J 7/34* (2013.01); *H02M 2001/0077* (2013.01); *Y10T 307/625* (2015.04)

(58) Field of Classification Search
CPC ................. H02M 3/33523; H02M 2001/0077; Y10T 307/625; H02J 7/34; H02J 1/108
USPC .......................................................... 307/66
See application file for complete search history.

(56) References Cited

U.S. PATENT DOCUMENTS

| | | | |
|---|---|---|---|
| 6,408,148 B1 * | 6/2002 | Yamamoto | ...................... 399/88 |
| 2006/0209572 A1 | 9/2006 | Schlecht | |

FOREIGN PATENT DOCUMENTS

| | | |
|---|---|---|
| CN | 101599641 | 12/2009 |
| CN | 101662212 | 3/2010 |
| JP | 2004103345 | 4/2004 |
| JP | 2008086114 | 4/2008 |
| TW | 501335 | 9/2002 |
| TW | M361055 | 7/2009 |
| TW | 201004471 | 1/2010 |

* cited by examiner

*Primary Examiner* — Daniel Cavallari
(74) *Attorney, Agent, or Firm* — Kirton McConkie; Evan R. Witt

(57) ABSTRACT

A high-voltage power supply module includes a front-end power converting circuit, a first back-end circuit, a second back-end circuit, a ground terminal and a controlling unit. The front-end power converting circuit receives an input voltage and converts the input voltage into a bus voltage. The first back-end circuit receives the bus voltage and outputs a first voltage. The second back-end circuit receives the bus voltage and outputs a second voltage. The first back-end circuit and the second back-end circuit are connected with a connecting terminal. The ground terminal is connected with the connecting terminal. In response to the first voltage and the second voltage, a first control signal and a second control signal are respectively issued from the controlling unit to the first back-end circuit and the second back-end circuit, thereby adjusting the magnitudes of the first voltage and the second voltage.

8 Claims, 6 Drawing Sheets

HIGH-VOLTAGE POWER SUPPLY MODULE AND POWER SUPPLY SYSTEM

FIELD OF THE INVENTION

The present invention relates to a power supply module, and more particularly to a high-voltage power supply module. The present invention also relates to a power supply system with such a high-voltage power supply module.

BACKGROUND OF THE INVENTION

For reducing power loss and increasing efficiency of a power supply, a high-voltage DC power supply system is provided. By the high-voltage power supply system, the process of converting an AC voltage to a DC voltage is omitted before the electricity is transmitted to the load. Consequently, the operating efficiency is enhanced. Moreover, in views of long-distance power distribution, the high-voltage DC power supply system is more cost-effective and has less power loss than the common AC power supply system. Therefore, the trend of designing a high-voltage DC power supply system is toward low power consumption.

Generally, the high-voltage power supply system comprises a power supply. As known, an isolation transformer is one of the essential components of the power supply. The isolation efficacy of the transformer should be tested according to the safety regulations provided by UL (Underwriter Laboratories Inc., USA), CSA (Canadian Standards Association, Canada) or TUV (Technisher Uberwachungs-Verein, Germany). For example, a hi-pot test is performed to assure safety and reliability of the high-voltage resistant components.

FIG. 1 is a schematic circuit diagram illustrating a conventional power supply. The power supply 1 comprises an isolation transformer 11 for isolating an input terminal 12 from an output terminal 13. In addition, for protecting the user, the output positive terminal 131 or the output negative terminal 132 of the secondary side of the isolation transformer 11 is connected with a ground terminal 14. Consequently, the voltage of the secondary side of the isolation transformer 11 with respect to the ground terminal 14 is Vo or −Vo. In a case that the isolation transformer 11 has a breakdown, the fault current generated by the isolation transformer 11 will be transmitted to the ground terminal 14 to prevent the user from getting an electric shock.

However, since the ground terminal 14 is directly connected with the output positive terminal 131 or the output negative terminal 132, if the magnitude of the output voltage Vo or −Vo is several hundreds of volts (e.g. 400 volts), the demands on the safety regulation and the safety distance of the power supply system 1 become more stringent. Under this circumstance, the number of selective components is reduced, and the fabricating cost is increased. Moreover, since the volume of the common high-voltage resistant component is relatively bulky, the overall volume of the power supply 1 is increased.

Therefore, there is a need of providing a high-voltage power supply module and a power supply system so as to obviate the drawbacks encountered from the prior art.

SUMMARY OF THE INVENTION

The present invention provides high-voltage power supply module and a power supply system with such a high-voltage power supply module. The output sides of the first isolation converter and the second isolation converter are serially connected with a connecting terminal, and then connected with a ground terminal. Consequently, the voltage of the output positive terminal of the first isolation converter with respect to the ground terminal or the voltage of the output negative terminal of the second isolation converter with respect to the ground terminal is reduced. In such way, the demands on the safety regulation and the safety distance of the power supply module will be reduced. Moreover, since the number of the selective components of the high-voltage power supply module is increased, the fabricating cost and the volume of the high-voltage power supply module will be reduced.

In accordance with an aspect of the present invention, there is provided a high-voltage power supply module of a power supply system. The high-voltage power supply module includes a power converter circuit, a first isolation converter, a second isolation converter, a ground terminal and a controlling unit. The power converter circuit is used for receiving an input voltage and converting the input voltage into a bus voltage. The first isolation converter is used for receiving the bus voltage and outputting a first voltage. The first isolation converter has a first output negative terminal. The second isolation converter is used for receiving the bus voltage and outputting a second voltage. The second isolation converter has a second output positive terminal. The first output negative terminal and the second output positive terminal are connected with a connecting terminal. The ground terminal is connected with the connecting terminal. The controlling unit is connected with the first isolation converter and the second isolation converter. In response to the first voltage and the second voltage, a first control signal and a second control signal are respectively issued from the controlling unit to the first isolation converter and the second isolation converter, thereby adjusting the magnitudes of the first voltage and the second voltage.

In accordance with another aspect of the present invention, there is provided a power supply system. The power supply system includes plural high-voltage power supply modules and a communication interface. Each of the high-voltage power supply modules includes a power converter circuit, a first isolation converter, a second isolation converter, a ground terminal and a controlling unit. The power converter circuit is used for receiving an input voltage and converting the input voltage into a bus voltage. The first isolation converter is used for receiving the bus voltage and outputting a first voltage and a first current. The first isolation converter has a first output negative terminal. The second isolation converter is used for receiving the bus voltage and outputting a second voltage and a second current. The second isolation converter has a second output positive terminal. The first output negative terminal and the second output positive terminal are connected with a connecting terminal. The ground terminal is connected with the connecting terminal. The controlling unit is connected with the first isolation converter and the second isolation converter. In response to the first voltage and the second voltage, a first control signal and a second control signal are respectively issued from the controlling unit to the first isolation converter and the second isolation converter, thereby adjusting the magnitudes of the first voltage and the second voltage. The communication interface is connected with the controlling units of the plural high-voltage power supply modules. The output sides of the plural high-voltage power supply modules are connected with each other in parallel. The controlling units of the plural high-voltage power supply modules communicate with each other through the communication interface, thereby adjusting the magnitudes of the first current and the second current.

In accordance with a further aspect of the present invention, there is provided a power supply system. The power supply system includes a high-voltage power supply module, a charging module, a battery module and a distribution module. The high-voltage power supply module includes a power converter circuit, a first isolation converter, a second isolation converter, a ground terminal and a controlling unit. The power converter circuit is used for receiving an input voltage and converting the input voltage into a bus voltage. The first isolation converter is used for receiving the bus voltage and outputting a first voltage. The first isolation converter has a first output negative terminal. The second isolation converter is used for receiving the bus voltage and outputting a second voltage. The second isolation converter has a second output positive terminal. The first output negative terminal and the second output positive terminal are connected with a connecting terminal. The ground terminal is connected with the connecting terminal. The controlling unit is connected with the first isolation converter and the second isolation converter. In response to the first voltage and the second voltage, a first control signal and a second control signal are respectively issued from the controlling unit to the first isolation converter and the second isolation converter, thereby adjusting the magnitudes of the first voltage and the second voltage. The charging module is connected with the controlling unit. The battery module is connected with the charging module and the ground terminal. The distribution module is connected with the battery module and a load. An output voltage of the high-voltage power supply module or an output voltage of the battery module is selectively transmitted to the load through the distribution module, thereby providing electric energy required for operating the load.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
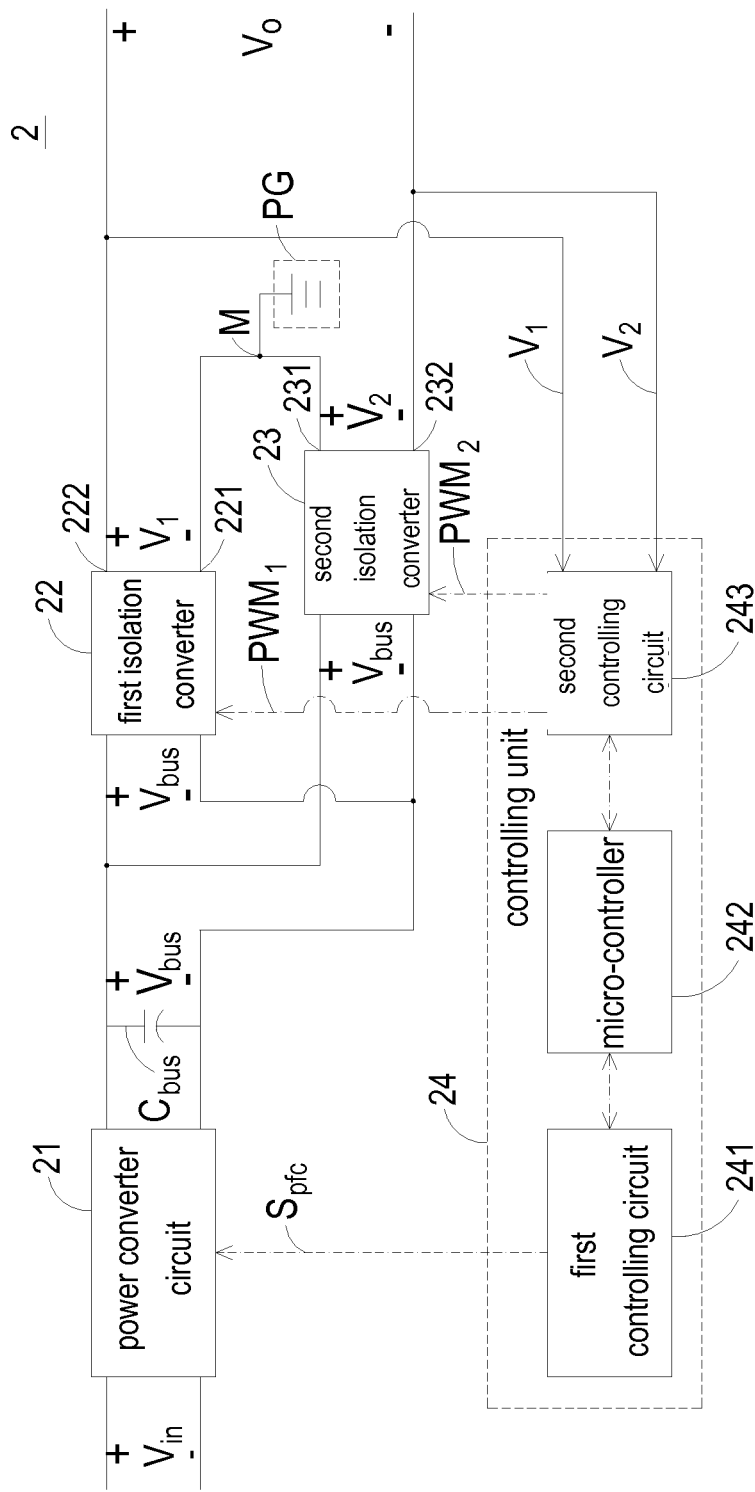
FIG. 2 is a schematic circuit block diagram illustrating a high-voltage power supply module according to an embodiment of the present invention.

FIG. 2 is a schematic circuit block diagram illustrating a high-voltage power supply module according to an embodiment of the present invention. As shown in FIG. 2, the high-voltage power supply module 2 comprises a power converter circuit 21, a first isolation converter 22, a second isolation converter 23, a ground terminal PG and a controlling unit 24. By the power converter circuit 21, an input voltage Vin is converted into a bus voltage Vbus. By the first isolation converter 22, the bus voltage Vbus is converted into a first voltage V1. The first isolation converter 22 comprises a first output negative terminal 221 and a first output positive terminal 222. By the second isolation converter 23, the bus voltage Vbus is converted into a second voltage V2. The second isolation converter 23 comprises a second output positive terminal 231 and a second output negative terminal 232. The first output negative terminal 221 of the first isolation converter 22 and the second output positive terminal 231 of the second isolation converter 23 are connected with a connecting terminal M. A ground terminal PG is connected with the connecting terminal M. The controlling unit 24 is connected with the first isolation converter 22 and the second isolation converter 23 for receiving the first voltage V1 and the second voltage V2. In response to the first voltage V1 and the second voltage V2, a first control signal PWM1 and a second control signal PWM2 are respectively transmitted from the controlling unit 24 to the first isolation converter 22 and the second isolation converter 23 to control the magnitudes of the first voltage V1 and the second voltage V2. In addition, the output voltage Vo outputted from the high-voltage power supply module 2 is equal to the sum of the first voltage V1 and the second voltage V2, i.e. Vo=V1+V2.

Please refer to FIG. 2 again. The controlling unit 24 comprises a first controlling circuit 241, a micro-controller 242 and a second controlling circuit 243. Under control of the micro-controller 242, the first controlling circuit 241 issues a front-end control signal Spfc to control operation of the power converter circuit 21. In addition, according to the first voltage V1 and the second voltage V2, the second controlling circuit 243 is controlled by the micro-controller 242 to issue the first control signal PWM1 and the second control signal PWM2. According to the duty cycle of the first control signal PWM1, the magnitude of the first voltage V1 outputted from the first isolation converter 22 is adjusted. Similarly, according to the duty cycle of the second control signal PWM2, the magnitude of the second voltage V2 outputted from the first isolation converter 22 is adjusted.

In this embodiment, the input voltage Vin received by the power converter circuit 21 is a DC voltage or an AC voltage (e.g. 110V/220V from a utility power source). By the internal power converter (e.g. a DC-to-DC converter or an AC-to-DC converter) of the power converter circuit 21, the input voltage Vin is converted into the DC bus voltage Vbus. In addition, a filtering capacitor Cbus is connected with the output side of the power converter circuit 21. After the DC bus voltage Vbus is filtered by the filtering capacitor Cbus, the filtered bus voltage Vbus is transmitted to the first isolation converter 22 and the second isolation converter 23.

Moreover, the output side of the first isolation converter 22 and the output side of the second isolation converter 23 are serially connected with the connecting terminal M. The connecting terminal M is connected with the ground terminal PG. Consequently, the voltage of the first output positive terminal 222 of the first isolation converter 22 with respect to the ground terminal PG or the voltage of the second output negative terminal 232 of the second isolation converter 23 with respect to the ground terminal is reduced to the first voltage V1 or the second voltage V2. In such way, the insulation class of the components (e.g. capacitors, inductors, transformers, fuses, breakers, relays and connectors) of the first isolation converter 22 and the second isolation converter 23 are respectively reduced to the first voltage V1 or the second voltage V2.

Figure 1:
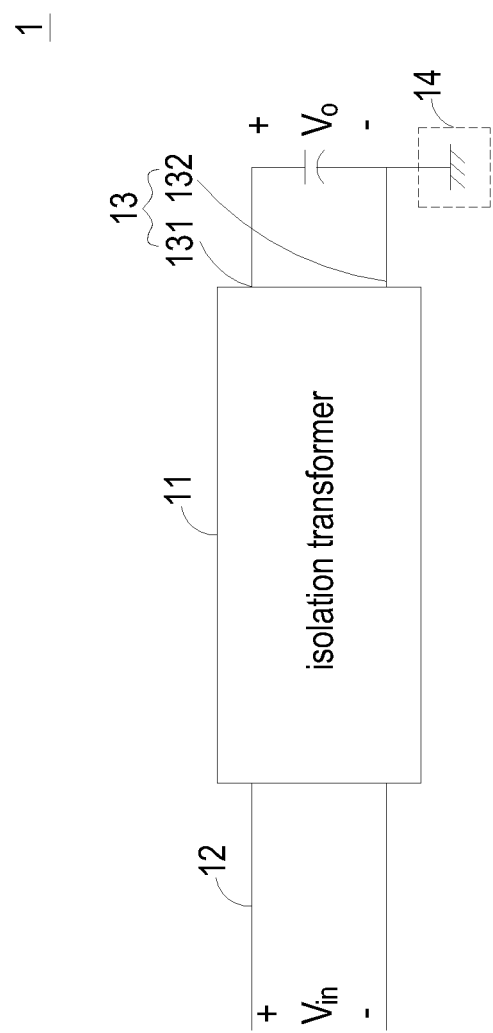
FIG. 1 is a schematic circuit diagram illustrating a conventional power supply.

Moreover, the output voltage Vo is equal to the sum of the first voltage V1 and the second voltage V2 (i.e. Vo=V1+V2) and the magnitude of the first voltage V1 or the second voltage V2 is lower than the magnitude of the output voltage Vo. Consequently, if the output voltage Vo from the high-voltage power supply module 2 is unchanged, the insulation class of the components of the first isolation converter 22 and the second isolation converter 23 will be lower than the insulation class of the components of the conventional power supply system as shown in FIG. 1. In such way, the demand on the safety distance will be lowered and the number of components to be selected will be increased.

According to the prior art, if a single center-tapped transformer (not shown) is used, the output terminals are controlled through the same input terminal. Under this circumstance, the magnitudes of the first voltage V1 and the second voltage V2 fail to be individually adjusted. According to the present invention, the magnitudes of the first voltage V1 and the second voltage V2 are adjusted by the controlling unit 24 according to the first voltage V1 from the first isolation converter 22 and the second voltage V2 from the second isolation converter 23.

According to the prior art, if a single center-tapped transformer (not shown) is used, the output terminals are controlled through the same input terminal. Under this circumstance, the magnitudes of the first voltage $V_1$ and the second voltage $V_2$ fail to be individually adjusted. According to the present invention, the magnitudes of the first voltage $V_1$ and the second voltage $V_2$ are adjusted by the controlling unit 24 according to the first voltage $V_1$ from the first back-end circuit 22 and the second voltage $V_2$ from the second back-end circuit 23.

Figure 3:
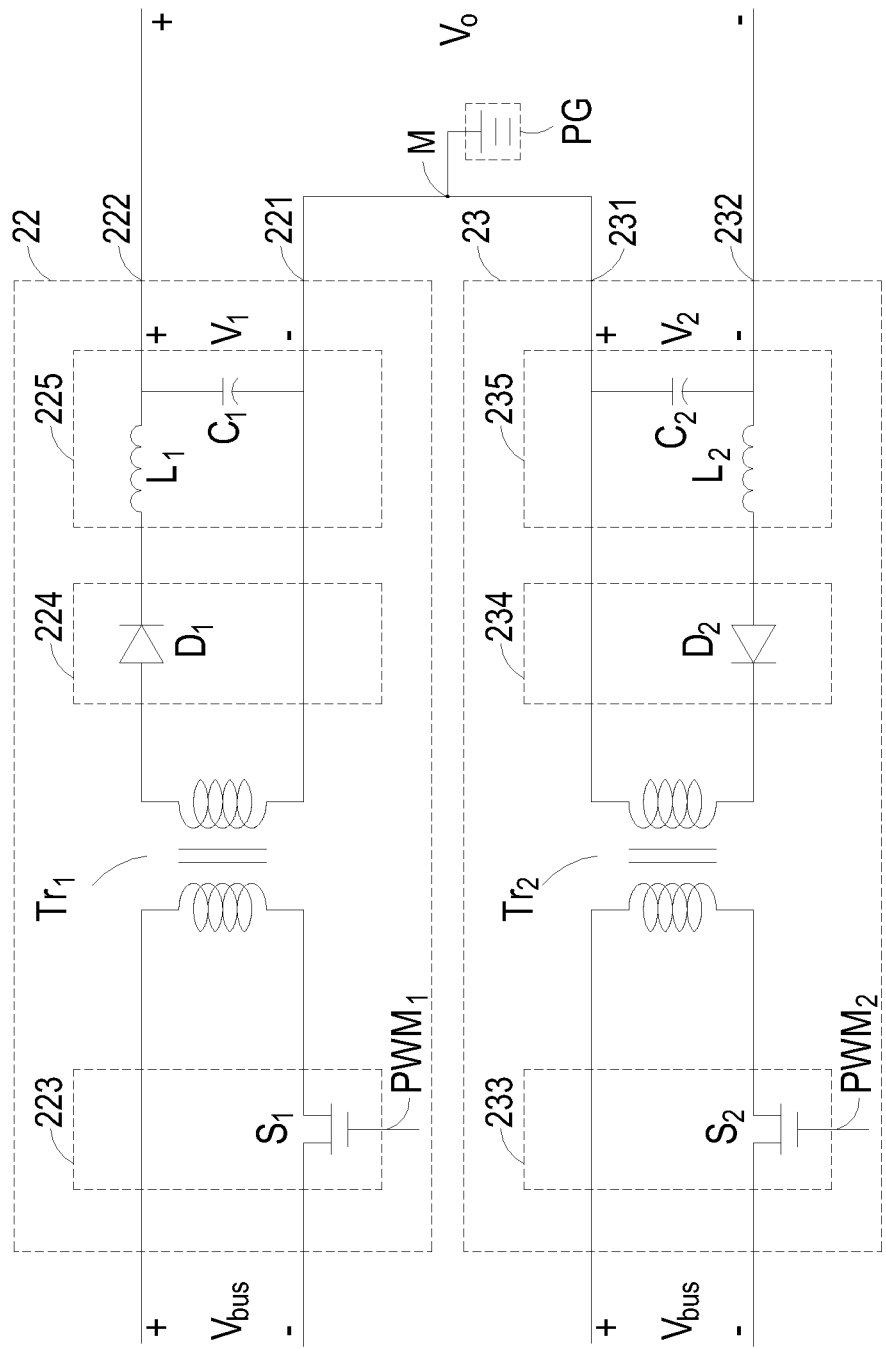
FIG. 3 is a schematic circuit block diagram illustrating a first exemplary architecture of the first isolation converter and the second isolation converter of the high-voltage power supply module of FIG. 2.

FIG. 3 is a schematic circuit block diagram illustrating a first exemplary architecture of the first isolation converter and the second isolation converter of the high-voltage power supply module of FIG. 2. Please refer to FIGS. 2 and 3. The first isolation converter 22 comprises a first switching circuit 223, a first isolation transformer Tr1, a first output rectifying circuit 224 and a first output filtering circuit 225. The second isolation converter 23 comprises a second switching circuit 233, a second isolation transformer Tr2, a second output rectifying circuit 234 and a second output filtering circuit 235. The first switching circuit 223 comprises a first switch S1. The second switching circuit 233 comprises a second switch S2. The first output rectifying circuit 224 comprises a first diode D1. The second output rectifying circuit 234 comprises a second diode D2. The first output filtering circuit 225 comprises a first inductor L1 and a first capacitor C1, which are serially connected with each other. The second output filtering circuit 235 comprises a second inductor L2 and a second capacitor C2, which are serially connected with each other.

Please refer to FIGS. 2 and 3 again. In response to the first control signal PWM1, the first switch S1 of the first switching circuit 223 is conducted. Consequently, the bus voltage Vbus is converted into a first AC voltage by the first isolation transformer Tr1. The first AC voltage is rectified by the first diode D1 of the first output rectifying circuit 224 and filtered by the first output filtering circuit 225 so that the first voltage V1 is outputted from the first isolation converter 22. Similarly, in response to the second control signal PWM2, the second switch S2 of the second switching circuit 233 is conducted. Consequently, the bus voltage Vbus is converted into a second AC voltage by the second isolation transformer Tr2. The second AC voltage is rectified by the second diode D2 of second output rectifying circuit 234 and filtered by the second output filtering circuit 235, so that the second voltage V2 is outputted from the second isolation converter 23.

Figure 4:
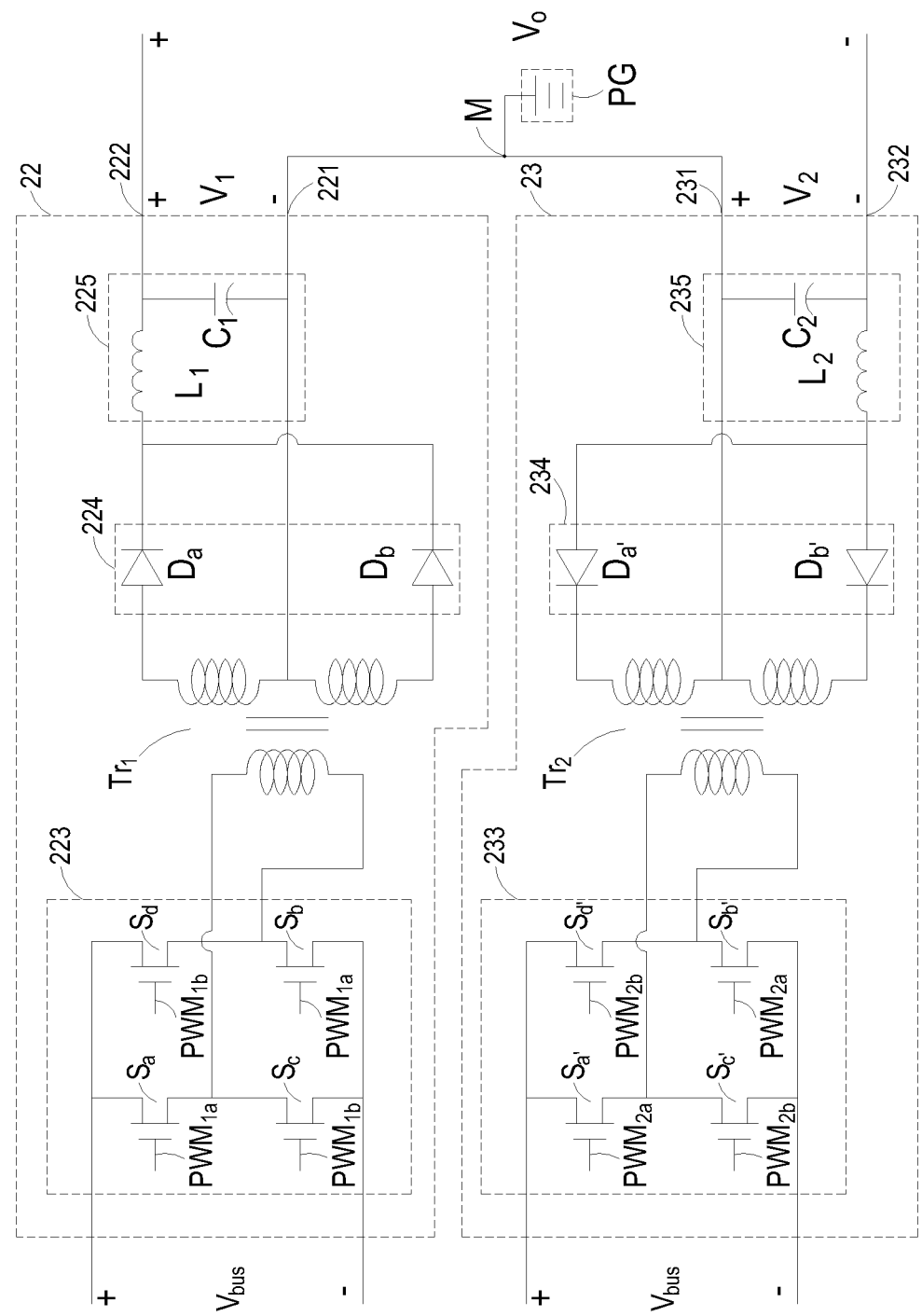
FIG. 4 is a schematic circuit block diagram illustrating a second exemplary architecture of the first isolation converter and the second isolation converter of the high-voltage power supply module of FIG. 2.

FIG. 4 is a schematic circuit block diagram illustrating a second exemplary architecture of the first isolation converter and the second isolation converter of the high-voltage power supply module of FIG. 2. Please refer to FIGS. 2 and 4. The first isolation converter 22 comprises a first switching circuit 223, a first isolation transformer Tr1, a first output rectifying circuit 224 and a first output filtering circuit 225. The second isolation converter 23 comprises a second switching circuit 233, a second isolation transformer Tr2, a second output rectifying circuit 234 and a second output filtering circuit 235. The connecting relationships between these components and the operations of these components are similar to those of FIG. 3, and are not redundantly described herein.

The first switching circuit 223 is a full-bridge switching circuit comprising plural switches $S_a$~$S_d$. The second switching circuit 233 is a full-bridge switching circuit comprising plural switches $S_{a'}$~$S_{d'}$. The on/off statuses of the switch $S_a$ and $S_b$ are controlled according to a first positive half cycle control signal $PWM_{1a}$ of the first control signal $PWM_1$. The on/off statuses of the switch $S_c$ and $S_d$ are controlled according to a first negative half cycle control signal $PWM_{1b}$ of the first control signal $PWM_1$. Similarly, the on/off statuses of the switch $S_{a'}$ and $S_{b'}$ are controlled according to a second positive half cycle control signal $PWM_{2a}$ of the second control signal $PWM_1$; and the on/off statuses of the switch $S_{c'}$ and $S_{d'}$ are controlled according to a second negative half cycle control signal $PWM_{2b}$ of the second control signal $PWM_2$.

The first output rectifying circuit 224 is a synchronous rectifier comprising plural diodes Da~Db. The second output rectifying circuit 234 is a synchronous rectifier comprising plural diodes Da'~Db'. The first isolation transformer Tr1 and the second isolation transformer Tr2 are center-tapped transformers. The center taps of the first isolation transformer Tr1 and the second isolation transformer Tr2 are serially connected with the connecting terminal M and the ground terminal PG. Under this circumstance, the insulation class of the first isolation converter 22 and the second isolation converter 23 may be lowered. In addition, the demand on the safety distance may be lowered.

In this embodiment, the duty cycles of the first positive half cycle control signal PWM1a and the first negative half cycle control signal PWM1b are determined according to the first voltage V1 outputted from the first isolation converter 22 to the back end second controlling circuit 243 of the controlling unit 24. The duty cycles of the second positive half cycle control signal PWM2a and the second negative half cycle control signal PWM2b are determined according to the second voltage V2 outputted from the first isolation converter 22 to the second controlling circuit 243 of the controlling unit 24. By the full-bridge switching circuits, the center-tapped transformers and the synchronous rectifiers, the efficiency of the power supply module 2 will be increased during the positive half cycle and the negative half cycle. If the first isolation transformer Tr1 or the second isolation transformer Tr2 has a breakdown, the possibility of getting an electric shock will be minimized. Moreover, in a case that plural high-voltage power supply modules are connected with each other in parallel, the output currents may be homogenized.

Figure 5:
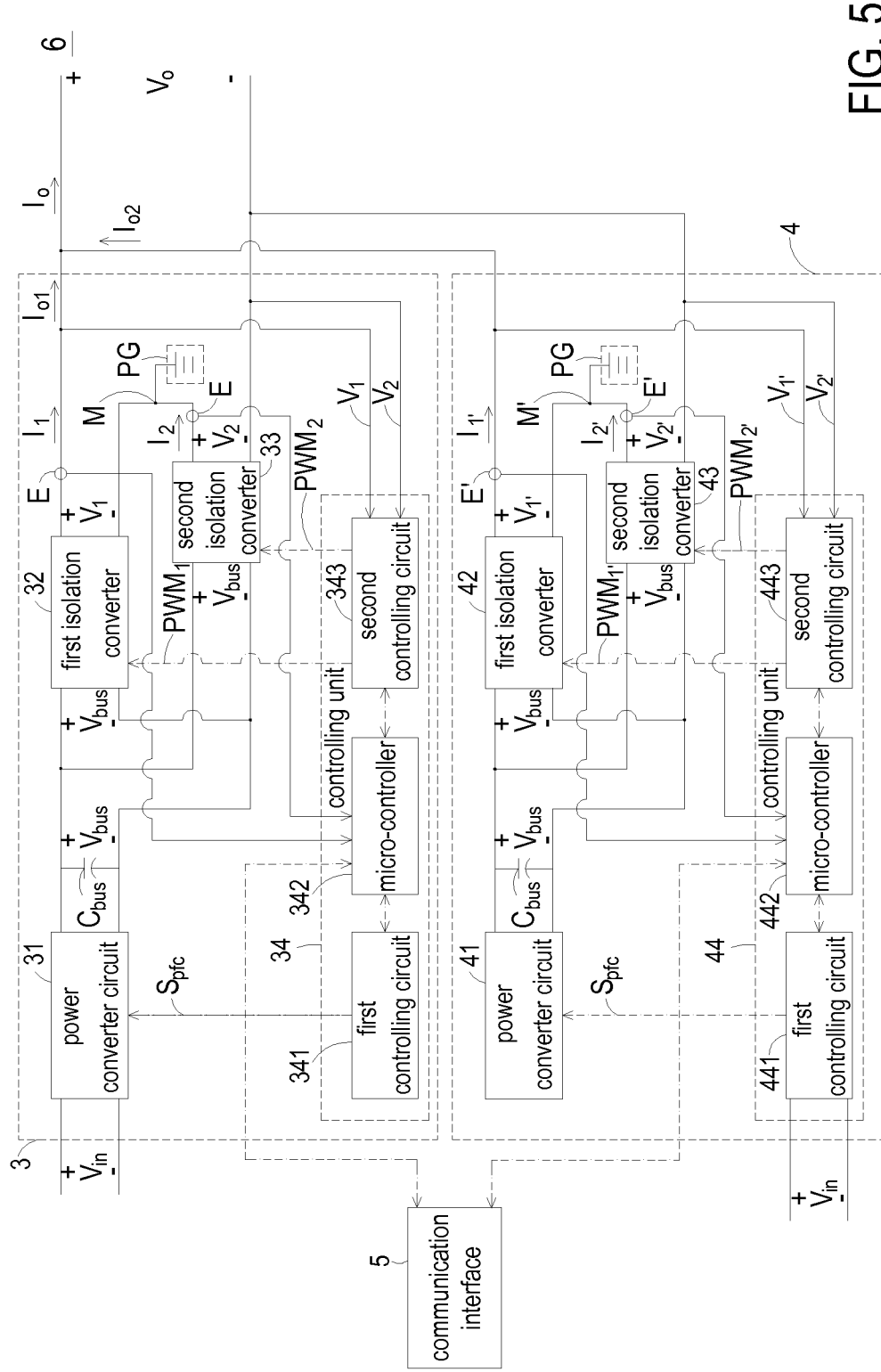
FIG. 5 is a schematic circuit block diagram illustrating a power supply system according to an embodiment of the present invention.

FIG. 5 is a schematic circuit block diagram illustrating a power supply system according to an embodiment of the present invention. As shown in FIG. 5, the power supply system 6 comprises a first high-voltage power supply module 3, a second high-voltage power supply module 4 and a communication interface. The first high-voltage power supply module 3 comprises a power converter circuit 31, a first isolation converter 32, a second isolation converter 33, a ground terminal PG and a controlling unit 34. The second high-voltage power supply module 4 comprises a power converter circuit 41, a first isolation converter 42, a second isolation converter 43, a ground terminal PG and a controlling unit 44. The controlling unit 34 comprises a first controlling circuit 341, a micro-controller 342 and a second controlling circuit 343. The controlling unit 44 comprises a first controlling circuit 441, a micro-controller 442 and a second controlling circuit 443. The connecting relationships between these components and the operations of these components are similar to those of FIG. 2, and are not redundantly described herein.

The output sides of the first high-voltage power supply module 3 and the second high-voltage power supply module 4 are connected with each other in parallel. A first voltage V1 and a first current I1 are outputted from the first isolation converter 32. A second voltage V2 and a second current I2 are outputted from the second isolation converter 33. A first voltage V1' and a first current IF are outputted from the first isolation converter 42. A second voltage V2' and a second current I2' are outputted from the second isolation converter 43. The voltages V1, V1', V2 and V2' are also transmitted to the second controlling circuits 343 and 443. According to the first voltage V1 and the second voltage V2, a first control signal PWM1 and a second control signal PWM2 are respectively issued to the first isolation converter 32 and the second isolation converter 33. According to the first voltage V1' and the second voltage V2', a first control signal PWM1' and a second control signal PWM2' are respectively issued to the first isolation converter 42 and the second isolation converter 43.

In addition, the first current I1 and the second current I2 are transmitted to the micro-controller 342 of the controlling unit 34, and the first current I1' and the second current I2' are transmitted to the micro-controller 442 of the controlling unit 44. Moreover, a detecting unit E is connected with the first isolation converter 32 and the second isolation converter 33, and a detecting unit E' is connected with the first isolation converter 42 and the second isolation converter 43. An example of the detecting unit E and the detecting unit E' includes but is not limited to a current transformer (CT), a Hall component or a detecting resistor. According to the first current I1 and the second current I2 detected by the detecting unit E, the magnitude of the first output current Io1 from the first high-voltage power supply module 3 is realized by the micro-controller 342 of the controlling unit 34, i.e. Io1=I1+I2. Similarly, according to the first current I1' and the second current I2' detected by the detecting unit E', the magnitude of the second output current Io2 from the second high-voltage power supply module 4 is realized by the micro-controller 442 of the controlling unit 44, i.e. Io2=I1'+I2'. The overall current outputted from the output sides of the high-voltage power supply module 3 and the high-voltage power supply module 4 is equal to the sum of the first output current Io1 and the second output current Io2, i.e. Io=Io1+Io2.

The micro-controller 342 of the high-voltage power supply module 3 and the micro-controller 442 of the high-voltage power supply module 4 communicate with each other through the communication interface 5. Through the communication interface 5, the output currents from all high-voltage power supply modules are realized. That is, the information associated with the second output current $I_{o2}$ from the second high-voltage power supply module 4 and the first output current $I_{o1}$ from the first high-voltage power supply module 3 will be acquired by the communication interface 5. According to the magnitudes of the second output current $I_{o2}$ and the first output current $I_{o1}$, the currents $I_1$, $I_2$, $I_{1'}$, and $I_{2'}$, are adjusted to be substantially identical. As a consequence, the output currents from the first high-voltage power supply module 3 and the second high-voltage power supply module 4 are homogenized. According to the prior art, if a single center-tapped transformer (not shown) is used, the positive output voltage and the negative output voltage are easily drifted and fail to be easily controlled, and the magnitudes of the first voltage $V_1$ and the second voltage $V_2$ fail to be individually adjusted. Whereas, according to the present invention, the magnitudes of the first voltage $V_1$ and the second voltage $V_2$ can be properly adjusted.

For example, if the first current I1 of the first high-voltage power supply module 3 is higher than the first current I1' of the second high-voltage power supply module 4 (i.e. I1>I1'), the second current I2 of the first high-voltage power supply module 3 is lower than the second current I2' of the second high-voltage power supply module 4 (i.e. I2<I2'). Meanwhile, according to the information associated with the second output current Io2 of the second high-voltage power supply module 4, the micro-controller 342 of the first high-voltage power supply module 3 will control the second controlling circuit 343 to increase the duty cycles of the first control signal PWM1 and the second control signal PWM2. Also, according to the information associated with the first output current Io1 of the first high-voltage power supply module 3, the micro-controller 442 of the second high-voltage power supply module 4 will control the second controlling circuit 443 to decrease the duty cycles of the first control signal PWM1' and the second control signal PWM2'. In such way, the first current I1 of the first high-voltage power supply module 3 and the first current IF of the second high-voltage power supply module 4 are adjusted to be substantially identical; and the second current I2 of the first high-voltage power supply module 3 and the second current I2' of the second high-voltage power supply module 4 are adjusted to be substantially identical. That is, when the two high-voltage power supply modules 3 and 4 are connected with each other in parallel, the output currents are homogenized.

Figure 6:
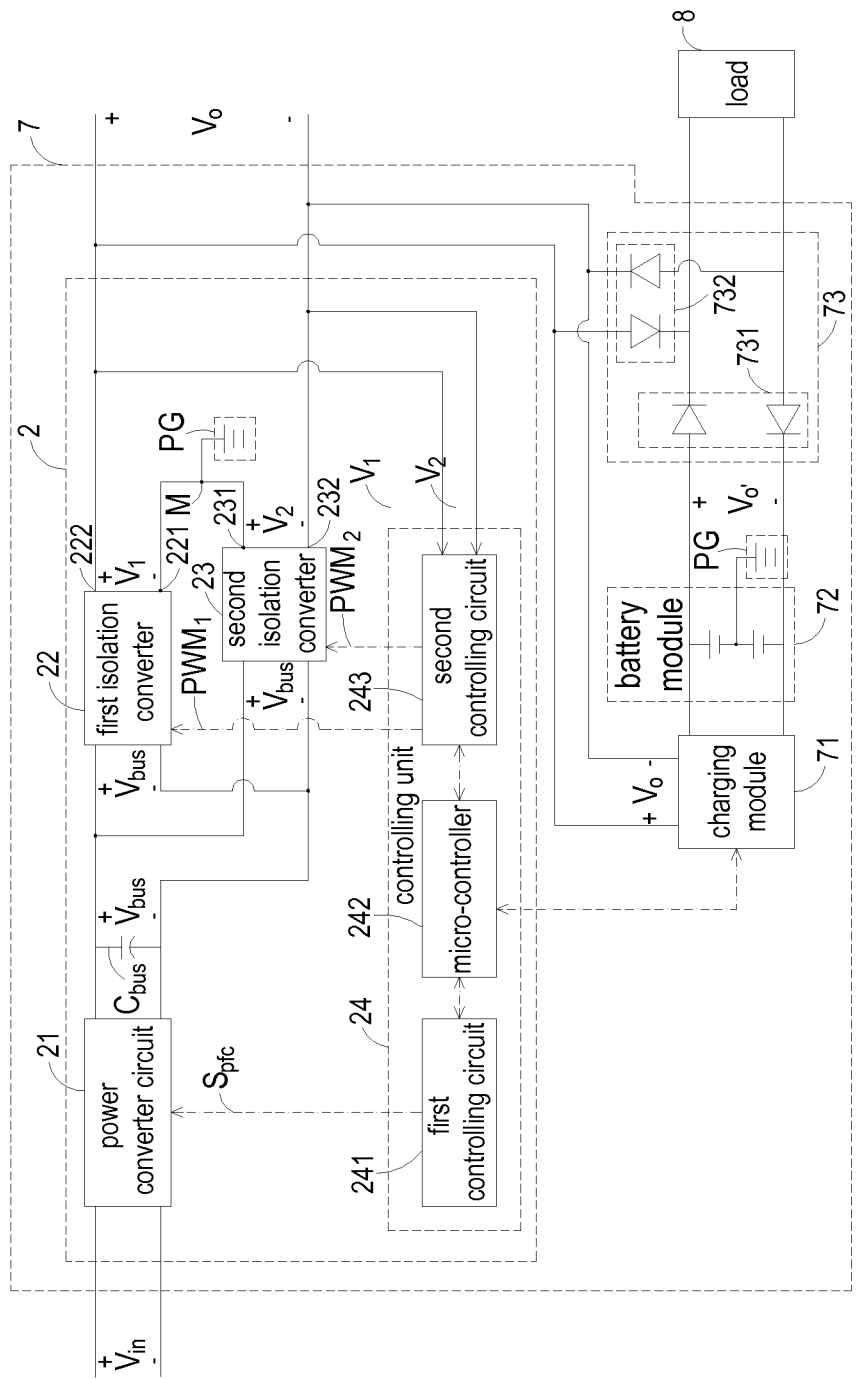
FIG. 6 is a schematic circuit block diagram illustrating a power supply system according to another embodiment of the present invention.

FIG. 6 is a schematic circuit block diagram illustrating a power supply system according to another embodiment of the present invention. In this embodiment, the power supply system 7 is an uninterruptible power supply (UPS) system. As shown in FIG. 6, the power supply system 7 comprises a high-voltage power supply module 2, a charging module 71 and a distribution module 73. The second high-voltage power supply module 2 comprises a power converter circuit 21, a first isolation converter 22, a second isolation converter 23, a ground terminal PG and a controlling unit 24. The controlling unit 24 comprises a first controlling circuit 241, a micro-controller 242 and a second controlling circuit 243. The connecting relationships between these components and the operations of these components are similar to those of FIG. 2, and are not redundantly described herein.

In this embodiment, the output side of the high-voltage power supply module 2 is connected with the charging module 71 and the distribution module 73 for transmitting the output voltage $V_o$ to the charging module 71 and the distribution module 73. The charging module 71 is connected with the micro-controller 242 of the high-voltage power supply module 2 and the charging module 71. The battery module 72 is connected with the distribution module 73 and the ground terminal PG. In this embodiment, the distribution module 73 comprises a first diode circuit 731 and a second diode circuit 732. The first diode circuit 731 is interconnected between the battery module 72 and a load 8. The second diode circuit 732 is interconnected between the high-voltage power supply module 2 and the load 8. Through the distribution module 73, an output voltage $V_o$ of the high-voltage power supply module 2 or an output voltage $V_{o'}$ of the battery module 72 is selectively transmitted to the load 8, thereby providing electric energy required for operating the load 8.

In a case that the supply of the input voltage $V_{in}$ is normal, the output voltage $V_o$ of the high-voltage power supply module 2 is transmitted to the load 8 through the distribution module 73. Meanwhile, the electric energy required for operating the load 8 is provided by the high-voltage power supply module 2. At the same time, in response a control signal issued from the micro-controller 242 to the charging module 71, the battery module 72 is charged by the output voltage $V_o$ of the high-voltage power supply module 2. Whereas, in a case that the supply of the input voltage $V_{in}$ is abnormal, the output voltage $V_{o'}$ of the battery module 72 is transmitted to the load 8 through the distribution module 73. Meanwhile, the electric energy required for operating the load 8 is provided by the battery module 72. As a consequence, the electric energy can be transmitted from the power supply system 7 to the load 8 in an uninterruptible manner.

From the above description, the present invention provides a high-voltage power supply module and a power supply system with such a high-voltage power supply module. The output sides of the first isolation converter and the second isolation converter are serially connected with a connecting terminal, and then connected with a ground terminal. Consequently, the voltage of the output positive terminal of the first isolation converter with respect to the ground terminal or the voltage of the output negative terminal of the second isolation converter with respect to the ground terminal is reduced. In such way, the demands on the safety regulation and the safety distance of the power supply module will be reduced. Moreover, since the number of the selective components of the high-voltage power supply module is increased, the fabricating cost and the volume of the high-voltage power supply module will be reduced.

The present invention further comprises a power supply system comprising two serially-connected high-voltage power supply modules. Through a communication interface, the output currents from the high-voltage power supply modules are interchanged with each other. As a consequence, the output currents from the high-voltage power supply modules are homogenized.

The present invention further comprises a power supply system with a distribution module. Through the distribution module, an output voltage of the high-voltage power supply module or an output voltage of the battery module is selectively transmitted to the load, thereby providing electric energy required for operating the load. As a consequence, the electric energy can be transmitted to the load in an uninterruptible manner.

While the invention has been described in terms of what is presently considered to be the most practical and preferred embodiments, it is to be understood that the invention needs not be limited to the disclosed embodiment.

On the contrary, it is intended to cover various modifications and similar arrangements included within the spirit and scope of the appended claims which are to be accorded with the broadest interpretation so as to encompass all such modifications and similar structures.

What is claimed is:

1. A high-voltage power supply module of a power supply system, said high-voltage power supply module comprising:
   a power converter circuit receiving an input voltage and converting said input voltage into a bus voltage;
   a first isolation converter receiving said bus voltage and outputting a first voltage, wherein said first isolation converter has a first output negative terminal;
   a second isolation converter receiving said bus voltage and outputting a second voltage, wherein said second isolation converter has a second output positive terminal, and said first output negative terminal and said second output positive terminal are connected with a connecting terminal;
   a ground terminal connected with said connecting terminal; and
   a controlling unit connected with said first isolation converter and said second isolation converter, wherein in response to said first voltage and said second voltage, a first control signal and a second control signal are respectively issued from said controlling unit to said first isolation converter and said second isolation converter to adjust the magnitudes of said first voltage and said second voltage.

2. The high-voltage power supply module according to claim 1 wherein said controlling unit comprises:
   a first controlling circuit connected with said power converter circuit;
   a micro-controller connected with said first controlling circuit controlling said first controlling circuit to issue a front-end control signal to said power converter circuit; and
   a second controlling circuit connected with said micro-controller,
   wherein said second controlling circuit is controlled by said micro-controller to issue said first control signal and said second control signal to said first isolation converter and said second isolation converter, respectively.

3. The high-voltage power supply module according to claim 1 wherein an output terminal of said first isolation converter and an output terminal of said second isolation converter are connected with each other in series.

4. The high-voltage power supply module according to claim 1 wherein said first isolation converter comprises a first switching circuit, a first isolation transformer, a first output rectifying circuit and a first output filtering circuit, and said second isolation converter comprises a second switching circuit, a second isolation transformer, a second output rectifying circuit and a second output filtering circuit.

5. The high-voltage power supply module according to claim 4 wherein said first switching circuit comprises a first switch, said second switching circuit comprises a second switch, said first output rectifying circuit comprises a first diode; said second output rectifying circuit comprises a second diode, said first output filtering circuit comprises a first inductor and a first capacitor connected with each other in series, and said second output filtering circuit comprises a second inductor and a second capacitor connected with each other in series.

6. The high-voltage power supply module according to claim 4 wherein each of said first switching circuit and said second switching circuit is a full-bridge switching circuit comprising plural switches, each of said first output rectifying circuit and said second output rectifying circuit is a synchronous rectifier comprising plural diodes, and each of said first isolation transformer and said second isolation transformer is a center-tapped transformer.

7. A power supply system, comprising:
plural high-voltage power supply modules, wherein each of said high-voltage power supply modules comprises:
a power converter circuit receiving an input voltage and converting said input voltage into a bus voltage;
a first isolation converter receiving said bus voltage and outputting a first voltage and a first current, wherein said first isolation converter has a first output negative terminal;
a second isolation converter receiving said bus voltage and outputting a second voltage and a second current, wherein said second isolation converter has a second output positive terminal, and said first output negative terminal and said second output positive terminal are connected with a connecting terminal;
a ground terminal connected with said connecting terminal; and
a controlling unit connected with said first isolation converter and said second isolation converter, wherein in response to said first voltage and said second voltage, a first control signal and a second control signal are respectively issued from said controlling unit to said first isolation converter and said second isolation converter to adjust the magnitudes of said first voltage and said second voltage; and
a communication interface connected with said controlling units of said plural high-voltage power supply modules,
wherein output sides of said plural high-voltage power supply modules are connected with each other in parallel, and said controlling units of said plural high-voltage power supply modules communicate with each other through said communication interface to adjust the magnitudes of said first current and said second current.

8. A power supply system, comprising:
a high-voltage power supply module comprising:
a power converter circuit receiving an input voltage and converting said input voltage into a bus voltage;
a first isolation converter receiving said bus voltage and outputting a first voltage, wherein said first isolation converter has a first output negative terminal;
a second isolation converter receiving said bus voltage and outputting a second voltage, wherein said second isolation converter has a second output positive terminal, and said first output negative terminal and said second output positive terminal are connected with a connecting terminal;
a ground terminal connected with said connecting terminal; and
a controlling unit connected with said first isolation converter and said second isolation converter, wherein in response to said first voltage and said second voltage, a first control signal and a second control signal are respectively issued from said controlling unit to said first isolation converter and said second isolation converter to adjust the magnitudes of said first voltage and said second voltage;
a charging module connected with said controlling unit;
a battery module connected with said charging module and said ground terminal, and comprising at least one battery; and
a distribution module connected with said battery module and a load, and comprising a first diode circuit and a second diode circuit,
wherein an output voltage of said high-voltage power supply module or an output voltage of said battery module is selectively transmitted to said load through said distribution module to provide electric energy required for operating said load.

* * * * *